US006543935B2

(12) United States Patent
Balla et al.

(10) Patent No.: US 6,543,935 B2
(45) Date of Patent: Apr. 8, 2003

(54) METHOD AND SYSTEM FOR INSTANTANEOUSLY DETERMINING THE TEMPERATURE OF A LOW DENSITY GAS USING ENSEMBLE RATIOING OF LASER-INDUCED FLUORESCENCE PEAKS

(75) Inventors: R. Jeffrey Balla, 5109 Goldsboro Dr., No. 8E, Newport News, VA (US) 23605; Reginald J. Exton, Williamsburg, VA (US)

(73) Assignee: R. Jeffrey Balla, Newport News, VA (US)

(*) Notice: Subject to any disclaimer, the term of this patent is extended or adjusted under 35 U.S.C. 154(b) by 0 days.

(21) Appl. No.: 09/846,129

(22) Filed: Apr. 30, 2001

(65) Prior Publication Data

US 2003/0021331 A1 Jan. 30, 2003

(51) Int. Cl.[7] .................................................. G01K 7/00
(52) U.S. Cl. ...................................... 374/161; 374/120
(58) Field of Search ............................... 374/120, 161; 250/458.1, 459.1; 356/43

(56) References Cited

U.S. PATENT DOCUMENTS

| | | | | |
|---|---|---|---|---|
| 4,708,494 A | * | 11/1987 | Kleinerman | 374/161 |
| 4,986,654 A | * | 1/1991 | Meijer et al. | 356/43 |
| 5,161,890 A | * | 11/1992 | Fima | 374/123 |
| 5,222,810 A | * | 6/1993 | Kleinerman | 374/161 |
| 5,332,316 A | * | 7/1994 | Kleinerman | 374/161 |
| 5,786,893 A | * | 7/1998 | Fink et al. | 356/301 |
| 5,826,984 A | * | 10/1998 | Fima | 374/161 |

OTHER PUBLICATIONS

Barker et al., "Velocimetry and Thermometry of Supersonic Flow Around a Cylindrical Body", AIAA Journal (USA), vol. 36, No. 6, pp. 1055–1060, Jun. 1998.*
Laufer et al., "Method for Measuring Temperatures and Densities in Hypersonic Wind Tunnel Air Flows Using Laser–Induced O2 Fluorescence", Applied Optics (USA), vol. 29, No. 33, pp. 4873–4883, Nov. 20, 1990.*

Fletcher et al., "Temperature Measurement in a Compressible Flow Field Using Laser–Induced Iodine Fluorescence", Optics Letters, vol. 12, No. 1, pp. 16–18, Jan. 1987.*

Hartfield et al., "Planar Temperature Measurement in Compressible Flows Using Laser–Induced Iodine Fluorescence", Optics Letters, vol. 16, No. 2, Jan. 15, 1991.*

"Flow Visualization Using Fluorescence From Locally Seeded $I_2$ Excited By An A&F Excimer Laser", R.I. Exton et al., 1999.

"Atlas of the Schumann–Runge . . . Wavelength Region 175–205nm", Yoshino et al, J. Phys. Chem. Ref. Data, vol. 13, 1984, pp. 207–227.

* cited by examiner

Primary Examiner—Diego Gutierrez
Assistant Examiner—Mirellys Jagan
(74) Attorney, Agent, or Firm—Peter J. Van Bergen

(57) ABSTRACT

A method and system are provided for determining temperature of a low density gas seeded with molecules of iodine. The Cordes bands of the iodine molecules are excited with light energy of a known wavelength (e.g., between 175–210 nanometers) to generate fluorescent emission. At least a portion of the emission's light intensity is collected and used to generate an emission spectrograph. The spectrograph's vibrational energy level peaks are fitted to a vibrational Boltzmann distribution. Specifically, one of the vibrational energy level peaks associated with molecule population in a ground vibrational energy level at a wavelength greater than the known wavelength of the light energy is selected. Next, a plurality of ratios are generated that define a unique linear relationship for a temperature of the seeded environment. Each of these ratios is defined by a ratio of the selected one of the vibrational energy level peaks (in a ground vibrational energy level) to another unique peak (of the vibrational energy level peaks) associated with molecule population in a vibrational energy level that is greater than the ground vibrational energy level.

44 Claims, 5 Drawing Sheets

METHOD AND SYSTEM FOR INSTANTANEOUSLY DETERMINING THE TEMPERATURE OF A LOW DENSITY GAS USING ENSEMBLE RATIOING OF LASER-INDUCED FLUORESCENCE PEAKS

STATEMENT OF GOVERNMENT INTEREST

The invention described herein was made in the performance of official duties by employees of the United States Government and may be manufactured and used by or for the Government of the United States of America for governmental purposes without the payment of any royalties thereon or therefor.

FIELD OF THE INVENTION

The invention relates generally to measuring the temperature of a gas, and more particularly to a method and system for generating a series of laser-induced fluorescence peaks where each peak has contributions from an ensemble of populated energy states representing the rotational level distribution of multiple vibrational levels of the ground electronic state of a molecule, and where ratios of the peaks are used as a means to instantaneously determine the temperature of a low density gas such as that found in the wake of a structure in a high-speed gaseous flow.

BACKGROUND OF THE INVENTION

Understanding material or structural response to heat is important or critical in many applications. One area of particular interest is the study of aerothermodynamics which attempts to evaluate and predict heat response of materials or structures used in aeronautics and aerospace applications. Such applications include analysis of aerothermodynamic problems such as aerobraking, dynamics of planetary probes with payloads, and transitional flows impinging on thermal protection systems. For proper analysis, it is necessary to obtain data on flow unsteadiness, mixing, separation and reattachment points, along with near-wake and shear layer features such as temperature, density and transition location. This requires diagnostics capable of measurements in the low-density wake region created by models in hypersonic flows. For years, data has been obtained using intrusive flow-field-perturbing techniques such as Pitot tubes, thermocouples and hot-wire anemometry. However, use of such flow-disturbing devices is undesirable when trying to isolate/evaluate model performance.

More recently, a few molecular-based optical methods for making various diagnostic measurements have been developed. With respect to temperature measurements or thermometry as it is known, the optical methods generally involve some form of laser-induced fluorescence (LIF) in which one or more lasers are used to "interrogate" individual rotational and vibrational states of a naturally-occurring or molecular-seeded gas. Temperature is measured by probing the distribution of population over two or more states. Currently, there are three main approaches to LIF thermometry: i) excitation scans, ii) two-line interrogation, and iii) thermally-assisted LIF, each of which will be described briefly below.

Using a single continuously-tunable laser, the excitation scan method changes laser wavelength to scan over several rotational levels in a single specified vibrational level of the ground electronic state. Fluorescence from each transition is recorded with the fluorescence being proportional to the population of the absorbing rotational level. Temperature is determined by fitting the fluorescence excitation spectrum to the Boltzmann equation. However, the time required to scan multiple molecular transitions makes this approach unsuitable for making instantaneous temperature measurements. Further, the complexities associated with changing the laser's wavelength add to the cost of the measurement system.

Two-line fluorescence thermometry requires the use of two lasers fired sequentially into a gas. Each laser is typically tuned to a different rotational level in a single specified vibrational level of the ground electronic state. Using a fluorescence excitation spectrum, the relative population of the two states is measured and temperature is determined using the Boltzmann equation. However, the use of two lasers that must be fired sequentially adds to the cost and complexity of the system. Further, since the lasers are fired sequentially, this approach requires more than twice the time to measure temperature as a single laser approach.

Thermally-assisted LIF thermometry uses a single laser to pump a single rotational level from the ground electronic state to an excited electronic state. If the correct conditions exist, collisions with other gas molecules rapidly distribute the population in the excited electronic state. A model of the various collision transfer processes is used to predict the resulting population distribution as a function of temperature. Since the fluorescence spectrum reflects the excited state distribution, the fluorescence spectrum can be used as an indication of temperature. Thermally-assisted LIF assumes that gas composition and the temperature dependence of all state-specific collision transfer rates are known. However, since these quantities are generally not known, assumptions must be made which affect accuracy of the thermometry.

SUMMARY OF THE INVENTION

Accordingly, it is an object of the present invention to provide a method and system for determining temperature of a low-density gas.

Another object of the present invention is to provide a non-intrusive method and system for determining temperature of a low-density gas.

Still another object of the present invention is to provide a method and system for determining the temperature of a gas in the low-density wake region of an object subjected to a high-speed gaseous flow.

Yet another object of the present invention is to provide a method and system for determining the temperature of a low-density gas based on laser-induced fluorescence.

A further object of the present invention is to provide an improved laser-induced fluorescence thermometry methodology and system.

A still further object of the present invention is to provide a laser-induced fluorescence thermometry methodology and system that can provide a nearly instantaneous temperature determination.

Another object of the present invention is to provide a laser-induced fluorescence thermometry method and system that minimizes the use of toxic and/or corrosive seed chemicals.

Still another object of the present invention is to provide an instantaneous method and system for determining temperature of a gas by sampling the rotational level distribution from multiple populated vibrational levels of the ground electronic state.

Other objects and advantages of the present invention will become more obvious hereinafter in the specification and drawings.

In accordance with the present invention, a method and system are provided for determining temperature of a low density gas defined by a density not to exceed approximately $3 \times 10^{17}$ molecules per cubic centimeter. Such a low density gas environment is seeded with molecules of iodine wherein a seeded environment is created. The Cordes bands of the iodine molecules are excited with light energy of a known wavelength (e.g., between 175–210 nanometers) to generate fluorescent emission having light intensity. A fraction of the light intensity is collected and passed through a spectrograph. The spectrograph separates the light into its component wavelengths. The result is a series of peaks of light intensity versus wavelength. The light intensity in a given peak can be related to population in a specific vibrational energy level of the ground electronic state. After being assigned, appropriate peaks are then fit to a vibrational Boltzmann distribution. More specifically, one of the vibrational energy level peaks associated with molecule population in a ground vibrational energy level at a wavelength greater than the known wavelength of the light energy is selected. Next, a plurality of ratios are generated that define a unique linear relationship for a temperature of the seeded environment. Each of these ratios is defined by a ratio of the selected one of the vibrational energy level peaks (in a ground vibrational energy level) to another unique peak (of the vibrational energy level peaks) associated with molecule population in a vibrational energy level that is greater than the ground vibrational energy level.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
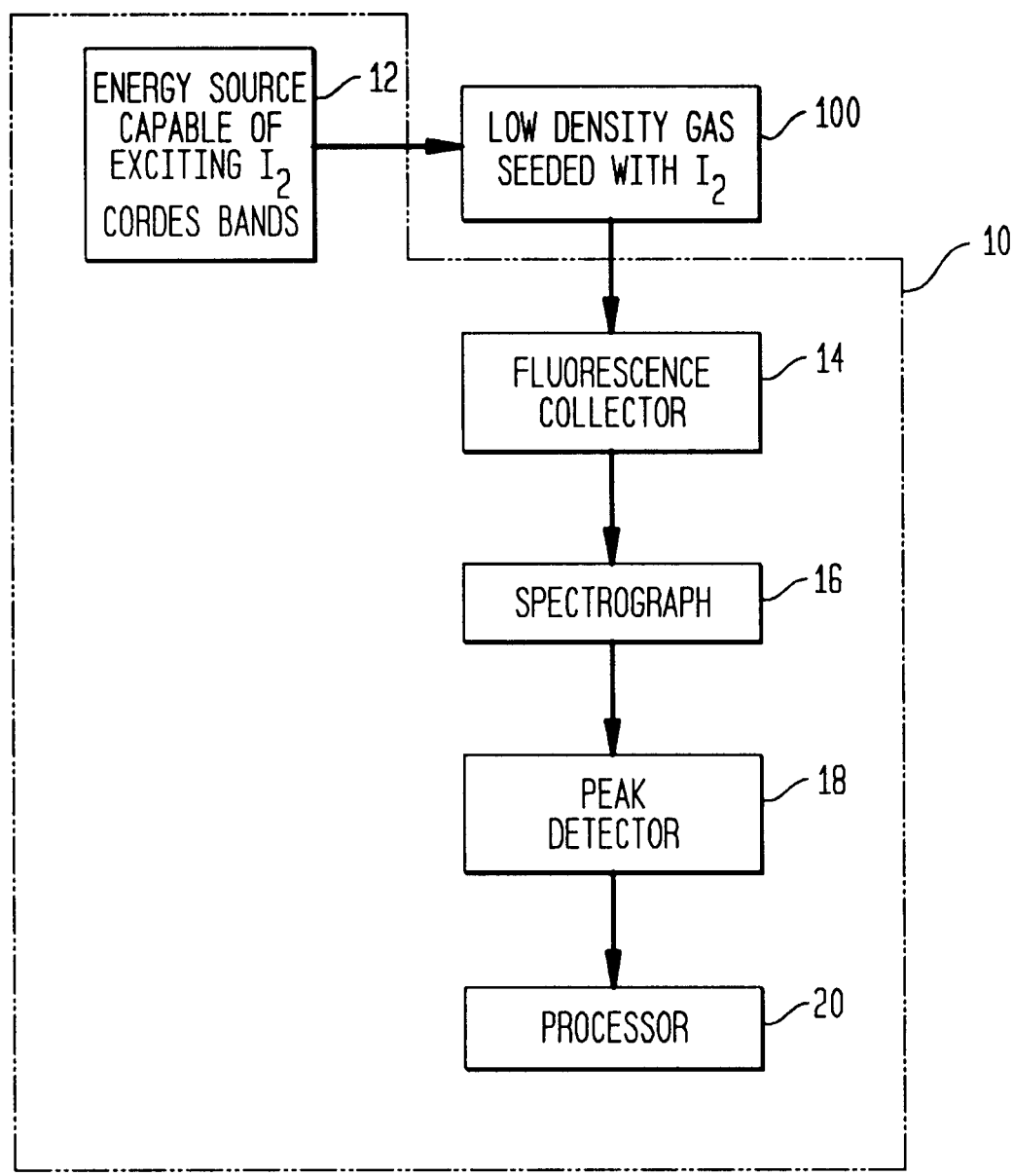
FIG. 1 is a block diagram of a system used for determining temperature of a low density gas using laser-induced fluorescence (LIF) according to the present invention.

Referring now to the drawings, and more particularly to FIG. 1, a block diagram of a system used to determine temperature of a low density gas according to the present invention is shown and contained within the dashed-line box tagged with reference numeral 10. By way of illustrative example, the low density gas will be air. However, it is to be understood that the present invention can be used to determine the temperature of any gaseous medium. Further, the gas can be stationary or moving at low or high speeds. Accordingly, the present invention can be used as a diagnostic tool for determining temperature in the low density wake region of an aerodynamic structure/vehicle.

For purpose of FIG. 1, the low density gas to be examined is in an environment designated by box 100. Environment 100 can be an open (e.g., atmosphere) or closed (e.g., test facility, wind tunnel, etc.) environment and is not a limitation of the present invention. As used herein, the term "low density" refers to a gas density that does not exceed approximately $3 \times 10^{17}$ (gas) molecules per cubic centimeter. Such densities are common in, for example, the wake region of an aerodynamic structure/vehicle, in a chemical vapor deposition chamber, and in a SCRAMJET combustor.

Environment 100 is locally seeded with a very small amount (less than approximately 0.01 grams) of iodine ($I_2$). Indeed, one of the great advantages of the present invention is its use of trace or minimal quantities of iodine thereby minimizing the toxic and corrosive effects thereof. By way of illustrative example, environment 100 can be the low density wake region of an aerodynamic object being tested in a wind tunnel. For details on the molecular seeding of a wake region, see "Flow Visualization Using Fluorescence From Locally Seeded $I_2$ Excited by an ArF Excimer Laser," R. J. Exton et al., Experiments in Fluids, Vol. 26, 1999, pp. 335–339, the contents of which are hereby incorporated by reference.

An energy source 12 is coupled to environment 100 to provide the energy necessary to bring about excitation of the Cordes bands ($D^1\Sigma^+_u \leftarrow X^1\Sigma^+_g$). Typically, energy source 12 is a light energy source (e.g., a laser) that can focus its energy at a particular location in environment 100 in a non-intrusive fashion. In terms of ultraviolet light sources, energy source 12 should have a wavelength in the range of approximately 175–210 nanometers (nm). In the embodiment described herein, energy source 12 is an argon fluoride (ArF) excimer laser tuned to an operating wavelength of approximately 193 nm. Such lasers are readily available, are easy to operate, and have a high output power thereby allowing the laser beam to be used to form a line when line measurements are desired. However, it is to be understood that energy source 12 could be any light or other energy source capable of exciting the Cordes bands of iodine. For example, energy source 12 could be a different-wavelength light source or could even be a source that produced an electric discharge in environment 100.

The 193 nm excimer laser is pulsed "on" for a period of time. For instantaneous measurements, pulse duration should be short relative to the speed of the gas flow. For average temperature measurements, pulse duration should be long relative to the speed of the gas flow. For example, if the goal is to make an instantaneous measurement of a supersonic/hypersonic gas flow moving at approximately 1 millimeter per microsecond, the pulse duration can be approximately 20 nanoseconds. This means that the gas moves only 20 micrometers during the 20 nanoseconds that the laser pulse is on. Hence, the temperature measurement is nearly instantaneous when compared to distance traveled by the gas flow.

Each laser pulse can be focused to irradiate a point in environment 100. Another option is to optically manipulate the laser beam to introduce a line of energy into environment 100. Focusing the laser to a specific point may be advantageous when temperature at a very specific location is desired. The use of a "line" of light energy may be advantageous when average temperature over an area in a gas is relevant or if spatially-resolved instantaneous measurements are relevant.

Fluorescence resulting from excitation of the iodine's Cordes bands is collected by a fluorescence collector 14. Collector 14 is any optical system capable of collecting a portion of the fluorescence and imaging it onto the entrance slits of a spectrograph 16. For example, collector 14 could simply be a lens, although other types of optical systems could be used. Optical systems for collecting fluorescence are well known in the art and will not be described in detail herein.

The fluorescence passes through spectrograph 16. As is known in the art, the spectrograph will disperse the fluorescence into its component frequencies and their associated intensities. A peak detector 18 placed at the exit of spectrograph 16 records component frequencies and their intensities. Selected peak intensities are processed by a processor 20 to generate linear relationships indicative of temperature as will be explained further below.

Figure 2:
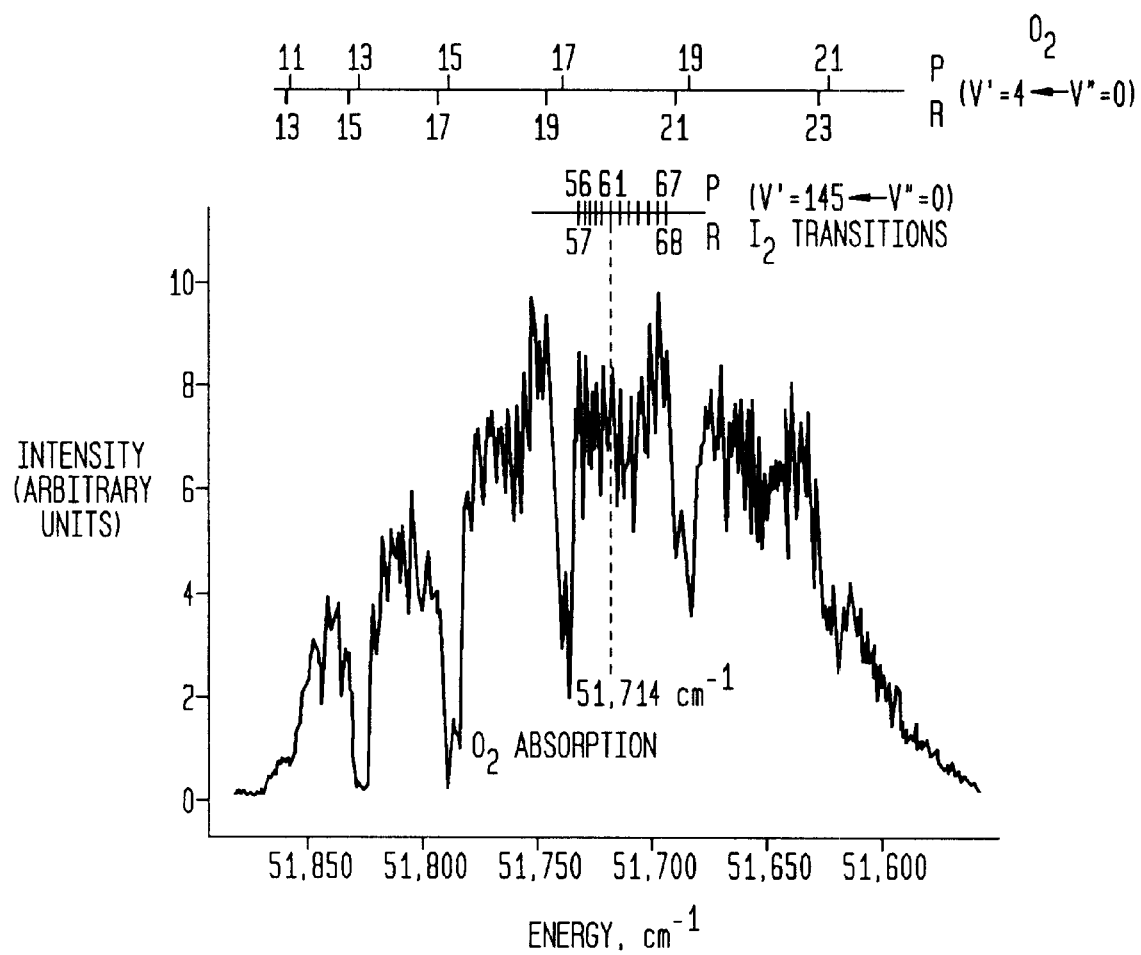
FIG. 2 is an $I_2$ Cordes band rotational excitation spectrum associated with $I_2$-seeded air at 295 K spanning the gain profile of a tunable argon fluoride excimer laser.
Figure 3:
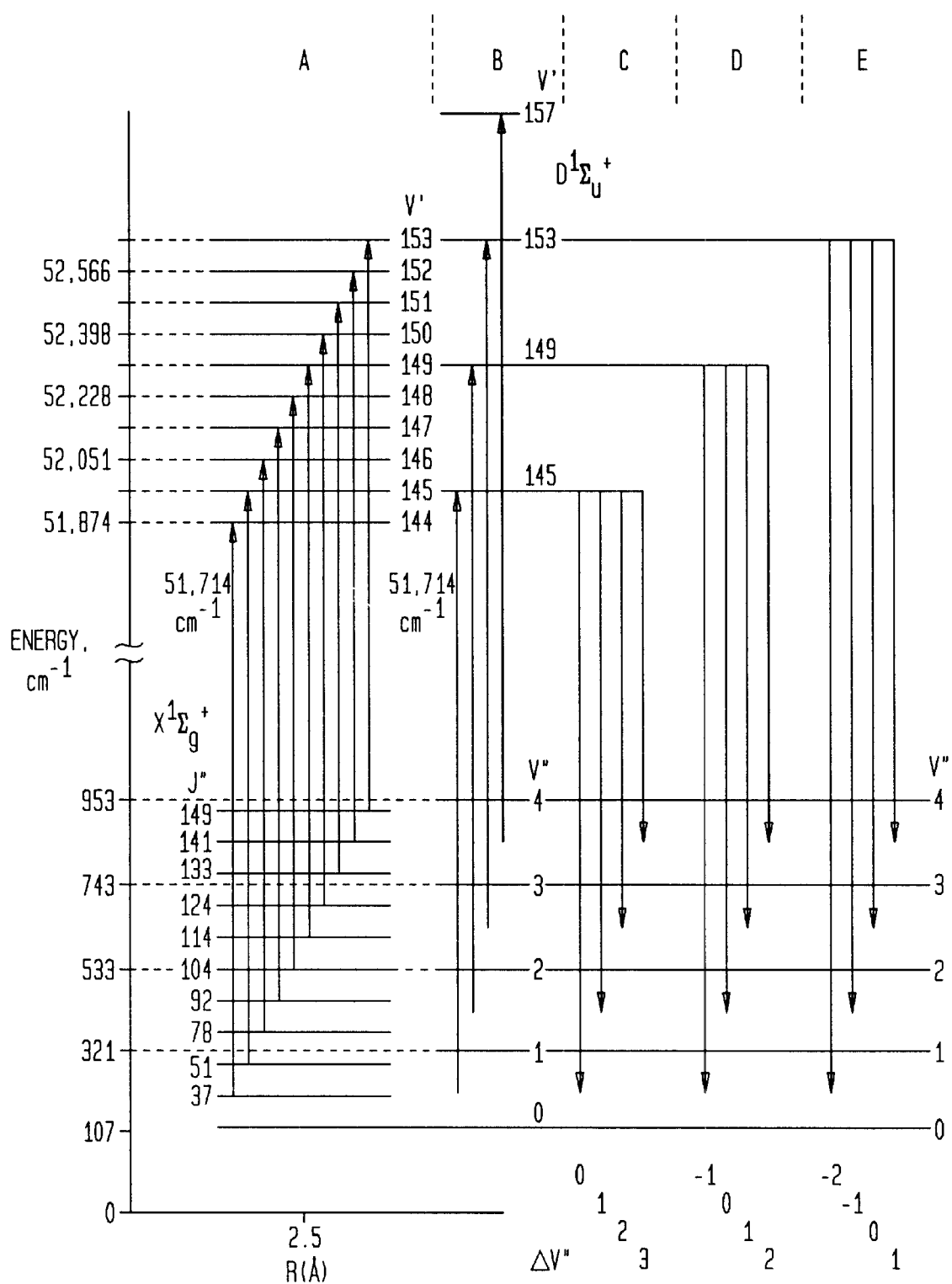
FIG. 3 is a simplified $I_2$ energy level diagram showing Cordes band transitions for absorption and bound-bound emission.

Before describing the selection of peak intensities and the data processing that is unique to the present invention, a description of the Cordes band excitation and emission processes will be described with the aid of FIGS. 2 and 3. FIG. 2 is an $I_2$ Cordes band rotational excitation spectrum and FIG. 3 is a simplified $I_2$ energy level diagram showing Cordes band transitions. Once again, the gas being examined is air seeded with $I_2$ and the excitation source (i.e., energy source 12) is a tunable 0.8 cm$^{-1}$ bandwidth ArF excimer laser tuned to 51,714 cm$^{-1}$, i.e., approximately 193 nm.

An $I_2$ rotational excitation spectrum spanning the ArF laser tuning range is shown in FIG. 2 where the (4–0) $O_2$ Schumann-Runge absorptions due to room air are used as frequency standards. For a more detailed description of Schumann-Runge absorption, see Yoshino et al., "Atlas of the Schumann-Runge Absorption Bands of $O_2$ in the Wavelength Region 175–205 nm," J. Phys. Chem. Ref. Data., Vol. 13, 1984, pp. 207–227. $I_2$ assignments are based on measured spectroscopic constants used to calculate $I_2$ Cordes band transitions. The well known constants for the first few terms of required equations are listed in Table 1.

TABLE 1

Partial list of spectroscopic constants in cm$^{-1}$ used to calculate $I_2$ Cordes band transitions.

|  | $D^1\Sigma^+_u$ | $X^1\Sigma^+_g$ |
|---|---|---|
| $T_e$ | 41028.58 | 0 |
| $\omega_e$ | 95.01 | 214.55 |
| $-\omega_e X_e$ | $-0.1101$ | $-0.6163$ |
| $+\omega_e Y_e$ | $-5.76 \times 10^{-4}$ | $7.5 \times 10^{-5}$ |
| $B_e$ | 0.020775 | 0.037363 |
| $-\alpha_e$ | $-0.00005$ | $-0.00011452$ |
| $+\gamma_e$ | $3.72 \times 10^{-8}$ |  |
| $D_e$ | 0 | $4.53 \times 10^{-9}$ |
| $\beta_e$ | 0 | $2.6 \times 10^{-11}$ |

In FIG. 2, twelve $I_2$ peaks near 51,714 cm$^{-1}$ are assigned the rotational states J"=56–67 from the V'=145←V"=0 band. Calculations show individual peaks consist of a P and R branch transition separated by 0.5–1.0 cm$^{-1}$. Measured average frequency separation between successive J" peaks is approximately 2.8 cm$^{-1}$. This agrees with calculations using constants in Table 1. Transitions from V'=145←V"=0 are one of several bands which contribute to these signals. In fact, at each rotational peak in FIG. 2, the tunable ArF excimer laser excites transitions from multiple rotational state J" levels in multiple V" vibrational energy level bands simultaneously. More specifically, FIG. 2 is the summation of at least 40 overlapping bands of rotational spectra excited from V"=0–3 and terminating on more than 14 D-state V' levels.

The large mass of I atoms (127 atomic mass units) in $I_2$ results in small vibrational (213 cm$^{-1}$) and rotational (2.8 cm$^{-1}$) ground state energy spacings. This results in a high density of overlapping rotational and vibrational energy states with population in high rotational (J">150) and vibrational energy level (V">3) states even at 300 K. The constants in Table 1 show V" energy spacing is double that in V' and the energy at J"=150 (V"=0) nearly equals the energy of J"=0 (V"=4). These properties are illustrated in the energy level diagrams in FIG. 3.

In FIG. 3, part A shows excitation due to the 0.8 cm$^{-1}$ bandwidth ArF excimer laser tuned to 51,714 cm$^{-1}$, i.e., approximately 193 nm. The selection rules are ΔJ=±1 while ΔV is unrestricted. For clarity, only P-branch transitions are shown. The laser simultaneously excites P-branch transitions from 10 different J" levels in V"=0. This populates 10 different V' levels. The laser simultaneously excites a nearly identical series of rotational transitions from all populated V". For clarity, only transitions excited from the most populated rotational level (J"≈50) for a given V" are shown in FIG. 3, part B. At 300 K, the 0.8 cm$^{-1}$ bandwidth ArF excimer laser excites at least 40 P-branch and 40 R-branch transitions, or 80 different rovibrational transitions spanning V"=0–3. Note that this number increases at higher temperatures. A similar series of transitions is excited at most rotational peaks in FIG. 2. Hence, rotational peaks in FIG. 2 are the summation of 40 overlapping sets of rotational spectra. The discrete structure illustrated in FIG. 2 results from $I_2$ having negligible vibrational anharmonicity and centrifugal distortion as is evident from the constants in Table 1.

Transitions near 51,714 cm$^{-1}$ are temperature and density broadened. To minimize signal variations due to these effects and possible laser frequency drifts, the laser bandwidth can be increased in bandwidth from 0.8 up to approximately seven wavenumbers. Increasing the laser bandwidth to approximately 7 wavenumbers doubled the number of excited transitions to 160 at 300 K.

Figure 4:
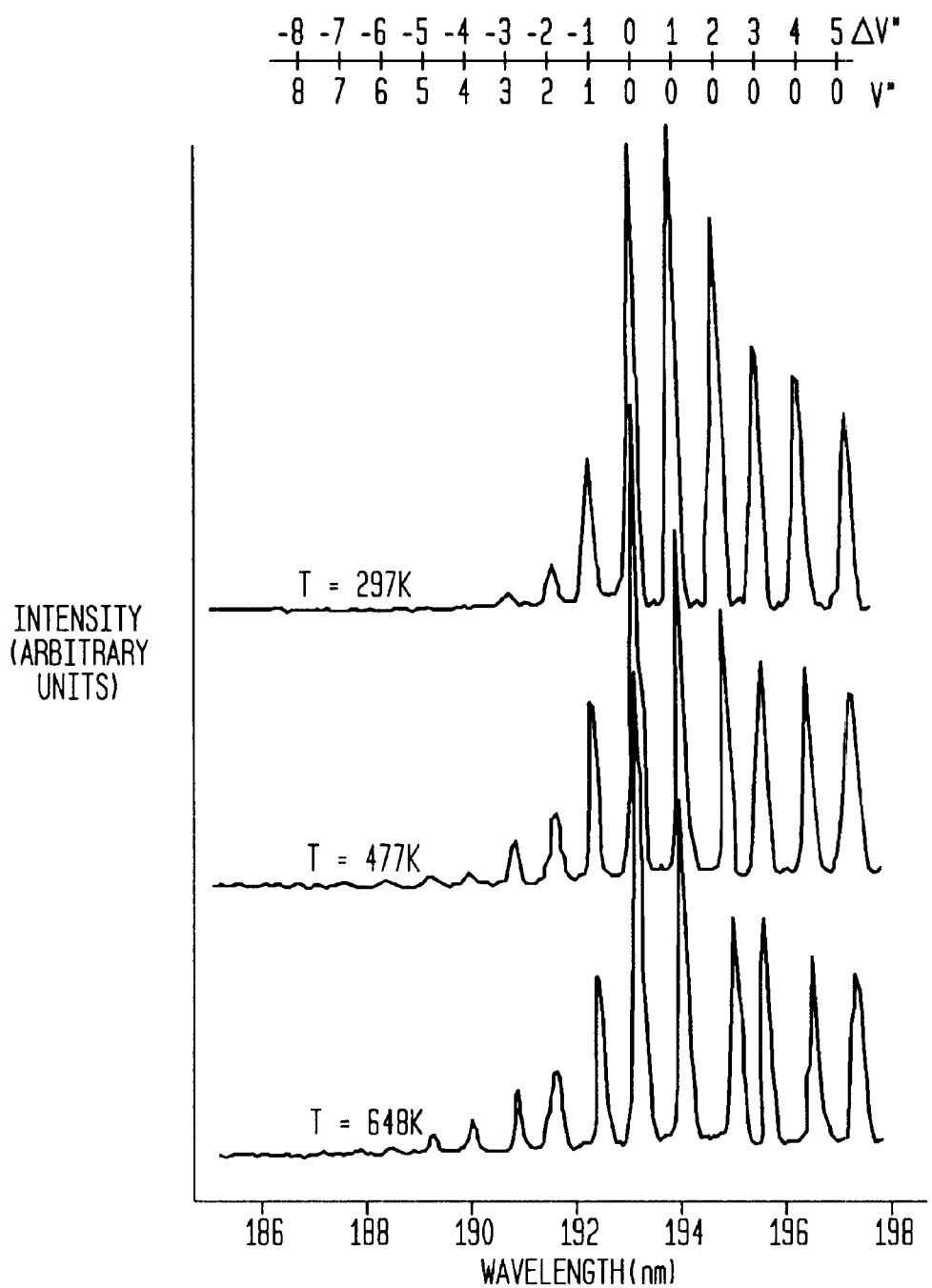
FIG. 4 depict spectrographs of the $I_2$ D→X bound-bound emission spectrum at 297 K, 477 K and 648 K following excitation by the argon fluoride excimer laser.

D state emission brought about by laser excitation occurs by several paths. Relevant emission for purposes of the present invention is due to D→X bound-bound transitions between discrete rovibrational levels. More specifically, temperature is determined in the present invention using emission from bound-bound transitions spanning 186–195 nm while all other emission is ignored. An example of bound-bound emission from V'=145 can be seen in FIG. 3, part C. Note that V'=145 can return to all V" levels. This creates a series of discrete emission peaks separated by V" energy spacing of ≈213 cm$^{-1}$. Each emission peak contains a small percentage of the total V'=145 emission. Emission spanning from 186–198 nm are shown in FIG. 4 at 297 K, 477 K and 648 K. Emission at wavelengths shorter than the ArF laser's approximately 193 nm wavelength are produced by population in V">0. A similar series of discrete emission peaks are produced from all populated V' levels. Examples from V'149 and 153 are shown in FIG. 3, parts D and E. Considering the myriad of vibrational and rotational levels excited in FIG. 3, a pseudo-continuum emission spectrum is expected.

There are several reasons for the discrete spectra observed in FIG. 4. First, each V' populated will produce a series of emissions separated by ≈213 cm$^{-1}$. Since the $I_2$ molecule has negligible vibrational anharmonicity, emission spectrum from multiple V' overlap to produce discrete emission. For example, consider the V'=145 ←V"=0 excitation illustrated in FIG. 3, part B. A small fraction of V'=145 will emit to V"=0. This emission is assigned ΔV"=0 in FIG. 4 and is defined as V"(final)−V"(initial). Additional contributions to emission at ΔV"=0 will occur from all V' excited. Examples from V'=149 and 153 are shown in FIG. 3, parts D and E. Similarly, emission at each labeled ΔV" level in FIG. 4 will have contributions from multiple V' levels.

A second reason for the discrete spectra illustrated in FIG. 4 is that the selection rule on ΔJ is ±1 where the J" energy spacing is about 2.8 cm$^{-1}$, and the laser's bandwidth is 6.7 cm$^{-1}$ for the experimental examples of the present invention. The excitation and emission process returns molecules to nearly their original J" levels. Hence, fluorescence emission bandwidths for P/R branches are less than 10 cm$^{-1}$. This bandwidth is small compared to the V" energy spacing of ≈213 cm$^{-1}$.

A third reason for the discrete spectra is that D state collision-induced rotational redistribution is negligible. That is, there are very few (i.e., <<1) $I_2$-$I_2$ collisions in low density (e.g., 1×10$^{15}$ cm$^{-3}$) $I_2$ during the D state lifetime of 15.5 ns. Previous studies have shown that D state removal requires only a single buffer-gas collision. This indicates negligible collisional redistribution.

In the present invention, temperature is determined using the bound-bound D→X emission spanning 186–195 nm. To illustrate the methodology of the present invention, spectrographs are shown in FIG. 4 at 297 K, 477 K and 648 K where ΔV" is defined as. V"(final)−V"(initial). V" assignments in FIG. 4 are discussed further below. As temperature increases, the series of vibrational energy level peaks labeled as ΔV"=1,−1,−2,−3, . . . or V"=0,1,2,3, . . . produce signal ratios which can be predicted using the $I_2$ $X^1\Sigma_g^+$ state vibrational Boltzmann distribution. Reasons for this unexpected result are described below.

The narrow band laser at 51,714 cm$^{-1}$ excites a series of rotational levels in V"=0 as discussed above and illustrated in FIG. 3, part A. The rotational levels span J"=37 to J">149 in J" increments typically ranging from 10–20. This excitation process effectively samples population in V"=0 regardless of temperature. This is equivalent to exciting the population of a vibrational level. A similar series of J" levels are excited from all V" populated in FIG. 3, part B. Therefore, the complex excitation process can be simplified by ignoring the population and temperature dependence of individual J" levels so that excitation can be described as occurring from all populated V" levels simultaneously.

Consider emission in FIG. 4 assigned as ΔV"=0 which occurs at approximately 193 nm. This emission has contributions from all V" excited. FIG. 3, parts B–E show emission at ΔV"=0 will have contributions from the sum of all V" levels excited where the sum is weighted by their vibrational population. This is true for emission in any vibrational energy level peak for ΔV">0 in FIG. 4. This vibrational population sum will be referred to herein as the 'effective' population.

Emission at ΔV"<0 will have contributions from V" levels different from those which contribute to ΔV"≧0. For example, consider the peak in FIG. 4 at ΔV"=−1. FIG. 3 shows emission results from population initially in V"=1,2, 3, . . . but not from V"=0. Likewise, emission in ΔV"=−2 results from population in V"=2,3,4, . . . but not from V"=0 or 1. Similar effects create signals for all ΔV"<0. Hence, emission signal at any ΔV" in FIG. 4 is related to the 'effective' vibrational population.

Vibrational Boltzmann populations at 300 K and 600 K are shown in Table 2 below. The 'effective' population in Table 2 is calculated by summing contributing vibrational populations. The 'effective' population creating signals at ΔV"≧0 equals the total population or 1. At 300 K, 'effective' population which creates a signal at ΔV"=−1 equals the total population minus the population in V"=0 which equals 1−0.6393=0.3606.

TABLE 2

Calculated vibrational ground state energy levels, Boltzmann and 'effective' populations and percentage relative difference of the population ratio ot the latter two at 300K and 600K.

| V" | Energy (cm$^{-1}$) | Boltzmann population 300K | Boltzmann population 600K | 'Effective' population 300K | 'Effective' population 600K | % Relative pop. ratio difference* 300K | % Relative pop. ratio difference* 600K |
|---|---|---|---|---|---|---|---|
| 0 | 107.1 | 0.6393 | 0.3977 | 1.0000 | 1.0000 | | |
| 1 | 320.5 | 0.2298 | 0.2384 | 0.3606 | 0.6023 | 0.32 | 0.48 |
| 2 | 532.6 | 0.0831 | 0.1434 | 0.1308 | 0.3639 | 0.63 | 0.92 |
| 3 | 743.4 | 0.0302 | 0.0865 | 0.0477 | 0.2205 | 0.98 | 1.38 |
| 4 | 953.0 | 0.0111 | 0.0523 | 0.0175 | 0.1340 | 0.79 | 1.90 |
| 5 | 1161.3 | 0.0041 | 0.0317 | 0.0065 | 0.0817 | 1.35 | 2.49 |
| 6 | 1368.4 | 0.0015 | 0.0193 | 0.0024 | 0.0500 | 2.29 | 3.03 |
| 7 | 1574.2 | 0.0006 | 0.0118 | 0.0009 | 0.0307 | | |
| 8 | 1778.8 | 0.0002 | 0.0072 | 0.0003 | 0.0189 | | |
| 9 | 1982.2 | 0.0001 | 0.0044 | 0.0001 | 0.0117 | | |
| 10 | 2184.3 | 0.0000 | 0.0027 | 0.0000 | 0.0073 | | |

*Calculated using the following equation where N is population in V":

$$\frac{\left(\frac{N}{N_0}\right)_{Boltzmann} - \left(\frac{N}{N_0}\right)_{effective}}{\left(\frac{N}{N_0}\right)_{Boltzmann}} \times 100$$

Considering an exemplary pair of vibrational levels in Table 2 (e.g., V"=0 and 1 at 300 K), the Boltzmann and 'effective' population ratios are 2.782 (i.e., 0.6393/0.2298) and 2.773 (i.e., 1.0/0.3606), respectively, which differ by 0.3%. The last two columns in Table 2 show results of calculations comparing the relative population difference in percent between the Boltzmann and 'effective' population ratios. For V"<6, the difference between the Boltzmann and 'effective ' population ratios at 300 K is less than or equal to 1.35%. Differences increase with increasing V" and temperature. However, even for V"<6 at 600 K, the difference is still less than 2.5%.

Thus, Table 2 shows that Boltzmann and 'effective' population ratios are nearly equivalent. Accordingly, signals in FIG. 4 corresponding to ΔV"=0,1,2 . . . can be associated with Boltzmann population in V"=0, while signals at ΔV"=−1,−2,−3, . . . can be associated with Boltzmann population in V"=1,2,3, . . . , respectively. The V" levels associated with signals at each ΔV" are labeled in FIG. 4. Note that the assignment of V" levels in FIG. 4 is not spectroscopically correct, but is used primarily in an attempt to clarify how emission peaks in FIG. 4 can be associated with a vibrational Boltzmann distribution.

The distribution of signals in FIG. 4 associated with V"=0,1,2,3, . . . ,8 for a given temperature behaves like a vibrational Boltzmann distribution. Hence, a series of signal ratios can be determined for a given temperature using the well known Boltzmann equation which is adapted in equation (1) for the present invention. Specifically, $$\frac{S(V'')}{S(0)} = C(V'', 0)\exp\left(-\frac{E(V'') - E(0)}{kT}\right) \quad (1)$$

To understand equation (1), the case involving population and signals corresponding to vibrational energy level peaks V″=0 and 1 will be described. E(V″) and E(0) are the vibrational energies corresponding to V″=0 and 1 given in Table 2. k is Boltzmann's constant and T is temperature in Kelvin. S(0) is the emission signal associated with population in any V″=0 except for that occurring at the excitation laser's wavelength (i.e., ΔV=0) which, in the illustrative example, is approximately 193 nm. This is because 5–30% of the signal at V″=0 at the excitation laser's wavelength is due to scattered laser light and is, therefore, not solely representative of fluorescence intensity. S(V″) is the signal associated with population in V″=1. This corresponds to signal at ΔV″=−1. Values for each S(V″) can be obtained by averaging several points at each peak.

Emission measurements spanning 186–195 nm require an additional factor designated in equation (1) as C(V″,0). the factor C(V″,0) is a required constant which relates the experimental S(V″)/S(0) and calculated exp{−(E(V″)−E(0))/kT} signal ratios by correcting for strong wavelength-dependent transmission losses. These transmission losses are due primarily to the $O_2$ Schumann-Runge band absorptions which increase rapidly from 200 nm to the atmospheric cutoff limit near 183 nm. Another source of transmission loss is due to performance degradation of fluorescence collection and transfer optics as wavelengths decrease. Values for C(V″,0) can be measured at multiple temperatures and for multiple pairs of emission ratios. Since variation in C(V″,0) is due mainly to transmission losses, the C(V″,0) values can be considered independent of temperature.

As mentioned above, a series of signal ratios are determined at a given temperature using equation (1). That is, at each temperature, the series of signal ratios are generated using the vibrational energy level peaks defined by the spectrograph of intensity at that temperature. For each such series/temperature, the S(0) component is a selected one of the ground vibrational energy level peaks (V″=0) at a wavelength greater than that of the excitation laser (e.g., approximately 193 nm in the illustrated example). For the largest ratios, the S(0) component is selected as the largest magnitude ground vibrational energy level peak for the spectrograph/temperature being processed, e.g., ΔV″=1 for the spectrographs in FIG. 4.

The selected S(0) component is ratioed against a plurality of vibrational energy level peaks S(V″) having molecule population in a vibrational energy level greater than the ground vibrational energy level, i.e., V″=1,2,3, . . . Note that equation (1) can be manipulated as follows to yield a linear relationship that is a function of temperature. Specifically, equation (1) can be rewritten as $$-\ln\left(\frac{\frac{S(V'')}{S(0)}}{C(V'',0)}\right) = \frac{E(V'') - E(0)}{kT} \quad (2)$$

where the portion of the expression $$\frac{E(V'') - E(0)}{k}$$

is essentially a calculated constant.

Figure 5:
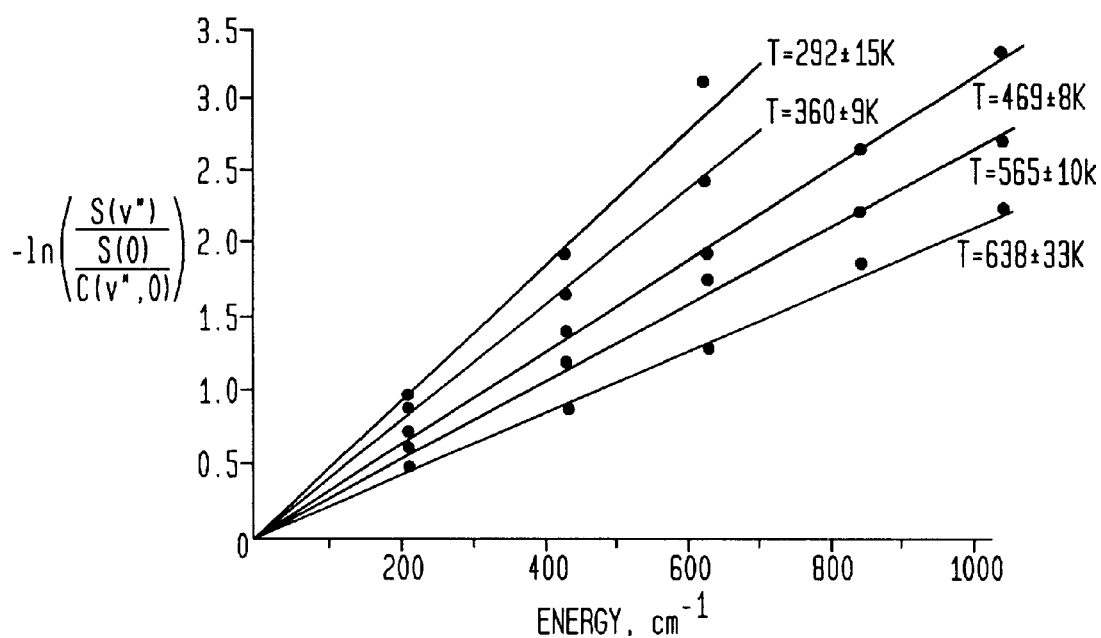
FIG. 5 is a graph depicting a plurality of vibrational Boltzmann temperatures determined from $I_2$ D→X bound-bound emission.

Thus, the present invention fits the vibrational energy level peaks for a given temperature to a vibrational Boltzmann distribution. The novel fitting of the vibrational energy level peaks in the present invention is accomplished by using a selected one of the ground vibrational energy level peaks and a plurality of the energy level peaks having a molecule population in a vibrational energy level greater than the ground level. The resulting series of ratios of population ensembles defines a unique linear relationship for each temperature represented by one of the spectrographs. Experimental application of the present invention at a number of known air temperatures yielded the graph shown in FIG. 5 where determined linear temperature relationships and their uncertainties are given for five measured temperatures.

Figure 6:
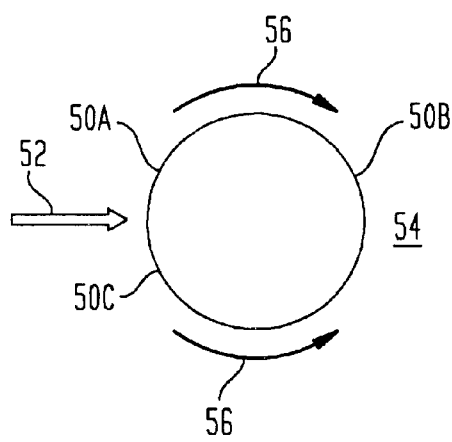
FIG. 6 is a schematic view of an object placed in a gaseous flow and seeded with $I_2$ molecules for purpose of the present invention.

As noted above, the present invention can be applied to stationary or moving gases. In terms of gas flows, the present invention will find great utility in wind tunnel testing of objects where temperature measurement in the low density wake region needs to be determined non-intrusively. FIG. 6 schematically illustrates how $I_2$ seeding for the present invention could take place in such a situation. An object 50 is placed in a gas flow indicated by arrow 52. The resulting upstream side of object 50 is indicated at 50A whereas the downstream side thereof is indicated at 50B. Typically, temperatures in the low density wake region 54 aft/adjacent downstream side 50B are of interest. The seeding of $I_2$ molecules into wake region 54 can be accomplished by placing a small amount (i.e., less than 0.01 grams) of $I_2$ in solution at the stagnation point 50C on upstream side 50A of object 50. The $I_2$ molecules are driven by gas flow 52 about object 50 (as indicated by arrows 56) into wake region 54. The Cordes band excitation source (not shown) described above is then used to apply its excitation energy into wake region 54.

The advantages of the present invention are numerous. Temperatures in low density gases can be determined instantaneously and non-intrusively by use of single laser. The gas can be moving or stationary. Measurements can be made at a specific point or along a line for determination of bulk gas temperatures. LIF in the present invention is generated by using only very small amounts of $I_2$ thereby eliminating the toxic and corrosive effects thereof. For all of the above reasons, the diagnostic approach of the present invention can be applied to a wide variety of applications to include temperature determination in the low density wake region of an object in a gas flow.

The present invention avoids several problems associated with conventional LIF thermometry. Specifically, data analysis in the present invention requires no knowledge of specific transitions excited, excited-state collisional-quenching effects, laser energy, $I_2$ concentration, or ground or excited state spectroscopic parameters except ground vibrational energy levels.

The present invention is an improvement over previous LIF thermometry approaches (e.g., excitation scans, two-line methods, and thermally-assisted methods) which probe a small fraction of the rovibrational distribution. In contrast, the present invention samples approximately 10% of the rotational levels in each vibrational level and the entire vibrational distribution in the ground electronic state. The resulting ratios of population ensembles defined for each temperature provide a novel implementation of a vibrational Boltzmann distribution.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A method of determining temperature of a low density gas, comprising the steps of:
   providing an environment containing a gas at a density not to exceed approximately $3 \times 10^{17}$ molecules per cubic centimeter;
   seeding said environment with molecules of iodine wherein a seeded environment is created;
   directing light energy into said seeded environment, said light energy having a wavelength selected from the range of 175–210 nanometers and having a bandwidth not to exceed seven wavenumbers, wherein Cordes bands of said molecules of iodine are excited resulting in fluorescent emission having light intensity;
   collecting at least a portion of said light intensity;
   generating a spectrograph of said portion of said light intensity, wherein vibrational energy level peaks as a function of wavelength are defined;
   selecting one of said vibrational energy level peaks associated with molecule population in a ground vibrational energy level at a wavelength greater than said wavelength of said light energy; and
   generating a plurality of ratios that define a unique linear relationship for a temperature of said seeded environment, each of said plurality of ratios defined by a ratio of said one of said vibrational energy level peaks to another unique peak of said vibrational energy level peaks associated with molecule population in a vibrational energy level that is greater than said ground vibrational energy level.

2. A method according to claim 1 wherein said step of providing comprises the step of placing an object in a flow of said gas wherein an upstream side and downstream side of said object are defined relative to said flow.

3. A method according to claim 2 wherein said step of seeding comprises the step of applying an amount of iodine to said upstream side of said object, said amount not to exceed approximately 0.01 grams of iodine, wherein said seeded environment is located adjacent said downstream side of said object.

4. A method according to claim 1 wherein said step of directing includes the step of pulsing an argon-fluoride excimer laser to generate said light energy in the form of pulses.

5. A method according to claim 4 wherein said argon-fluoride excimer laser is tuned to an operating wavelength of approximately 193 nanometers.

6. A method according to claim 5 wherein said step of generating said plurality of ratios utilizes said vibrational energy level peaks in a wavelength range between approximately 186–195 nanometers.

7. A method according to claim 1 wherein said one of said vibrational energy level peaks is a maximum in terms of its magnitude for said spectrograph.

8. A method of determining temperature of a low density gas, comprising the steps of:
   providing an environment containing a gas at a density not to exceed approximately $3 \times 10^{17}$ molecules per cubic centimeter;
   seeding said environment with molecules of iodine wherein a seeded environment is created;
   directing light energy into said seeded environment, said light energy having a wavelength selected from the range of 175–210 nanometers and having a bandwidth not to exceed seven wavenumbers, wherein Cordes bands of said molecules of iodine are excited resulting in fluorescent emission having light intensity;
   collecting at least a portion of said light intensity;
   generating a spectrograph of said portion of said light intensity, wherein vibrational energy level peaks as a function of wavelength are defined; and
   fitting said vibrational energy level peaks to a vibrational Boltzmann distribution using i) one of said vibrational energy level peaks associated with molecule population in a ground vibrational energy level at a wavelength greater than said wavelength of said light energy and ii) others of said vibrational energy level peaks associated with molecule population in a vibrational energy level that is greater than said ground vibrational energy level, wherein a unique linear relationship is defined by said vibrational Boltzmann distribution for each temperature of said seeded environment.

9. A method according to claim 8 wherein said step of providing comprises the step of placing an object in a flow of said gas wherein an upstream side and downstream side of said object are defined relative to said flow.

10. A method according to claim 9 wherein said step of seeding comprises the step of applying an amount of iodine to said upstream side of said object, said amount not to exceed approximately 0.01 grams of iodine, wherein said seeded environment is located adjacent said downstream side of said object.

11. A method according to claim 8 wherein said step of directing includes the step of pulsing an argon-fluoride excimer laser to generate said light energy in the form of pulses.

12. A method according to claim 11 wherein said argon-fluoride excimer laser is tuned to an operating wavelength of approximately 193 nanometers.

13. A method according to claim 12 wherein said step of generating said plurality of ratios utilizes said vibrational energy level peaks in a wavelength range between approximately 186–195 nanometers.

14. A method according to claim 8 wherein said one of said vibrational energy level peaks is a maximum in terms of its magnitude for said spectrograph.

15. A method of determining temperature of a low density gas, comprising the steps of:
   providing an environment containing a gas at a density not to exceed approximately $3 \times 10^{17}$ molecules per cubic centimeter;
   seeding said environment with molecules of iodine wherein a seeded environment is created;
   exciting Cordes bands of said molecules of iodine with light energy of a known wavelength to generate fluorescent emission having light intensity;
   collecting at least a portion of said light intensity;
   generating a spectrograph of said portion of said light intensity, wherein vibrational energy level peaks as a function of wavelength are defined;
   selecting one of said vibrational energy level peaks associated with molecule population in a ground vibrational energy level at a wavelength greater than said known wavelength of said light energy; and
   generating a plurality of ratios that define a unique linear relationship for a temperature of said seeded environment, each of said plurality of ratios defined by a ratio of said one of said vibrational energy level peaks to another unique peak of said vibrational energy level peaks associated with molecule population in a vibrational energy level that is greater than said ground vibrational energy level.

16. A method according to claim 15 wherein said step of providing comprises the step of placing an object in a flow of said gas wherein an upstream side and downstream side of said object are defined relative to said flow.

17. A method according to claim 16 wherein said step of seeding comprises the step of applying an amount of iodine to said upstream side of said object, said amount not to exceed approximately 0.01 grams of iodine, wherein said seeded environment is located adjacent said downstream side of said object.

18. A method according to claim 15 wherein said step of exciting includes the step of pulsing an argon-fluoride excimer laser to generate said light energy in the form of pulses.

19. A method according to claim 18 wherein said argon-fluoride excimer laser is tuned to an operating wavelength of approximately 193 nanometers, wherein said known wavelength is approximately 193 nanometers.

20. A method according to claim 19 wherein said step of generating said plurality of ratios utilizes said vibrational energy level peaks in a wavelength range between approximately 186–195 nanometers.

21. A method according to claim 15 wherein said one of said vibrational energy level peaks is a maximum in terms of its magnitude for said spectrograph.

22. A method of determining temperature of a low density gas, comprising the steps of:
  providing an environment containing a gas at a density not to exceed approximately $3 \times 10^{17}$ molecules per cubic centimeter;
  seeding said environment with molecules of iodine wherein a seeded environment is created;
  exciting Cordes bands of said molecules of iodine with light energy of a known wavelength to generate fluorescent emission having light intensity;
  collecting at least a portion of said light intensity;
  generating a spectrograph of said portion of said light intensity, wherein vibrational energy level peaks as a function of wavelength are defined; and
  fitting said vibrational energy level peaks to a vibrational Boltzmann distribution using i) one of said vibrational energy level peaks associated with molecule population in a ground vibrational energy level at a wavelength greater than said wavelength of said light energy and ii) others of said vibrational energy level peaks associated with molecule population in a vibrational energy level that is greater than said ground vibrational energy level, wherein a unique linear relationship is defined by said vibrational Boltzmann distribution for each temperature of said seeded environment.

23. A method according to claim 22 wherein said step of providing comprises the step of placing an object in a flow of said gas wherein an upstream side and downstream side of said object are defined relative to said flow.

24. A method according to claim 23 wherein said step of seeding comprises the step of applying an amount of iodine to said upstream side of said object, said amount not to exceed approximately 0.01 grams of iodine, wherein said seeded environment is located adjacent said downstream side of said object.

25. A method according to claim 22 wherein said step of exciting includes the step of pulsing an argon-fluoride excimer laser to generate said light energy in the form of pulses.

26. A method according to claim 25 wherein said argon-fluoride excimer laser is tuned to an operating wavelength of approximately 193 nanometers.

27. A method according to claim 26 wherein said step of generating said plurality of ratios utilizes said vibrational energy level peaks in a wavelength range between approximately 186–195 nanometers.

28. A method according to claim 22 wherein said one of said vibrational energy level peaks is a maximum in terms of its magnitude for said spectrograph.

29. A system for determining temperature of a gas at a density not to exceed approximately $3 \times 10^{17}$ molecules per cubic centimeter and seeded with molecules of iodine, said system comprising:
  means for directing light energy into said gas so-seeded, said light energy having a wavelength selected from the range of 175–210 nanometers and having a bandwidth not to exceed seven wavenumbers, wherein Cordes bands of said molecules of iodine are excited resulting in fluorescent emission having light intensity;
  means for collecting at least a portion of said light intensity;
  means for generating a spectrograph of said portion of said light intensity, wherein vibrational energy level peaks as a function of wavelength are defined; and
  means for generating a plurality of ratios that define a unique linear relationship for a temperature of said seeded environment, each of said plurality of ratios defined by a ratio of i) one of said vibrational energy level peaks associated with molecule population in a ground vibrational energy level at a wavelength greater than said wavelength of said light energy to ii) another unique peak of said vibrational energy level peaks associated with molecule population in a vibrational energy level that is greater than said ground vibrational energy level.

30. A system as in claim 29 wherein said means for directing comprises an argon-fluoride excimer laser generating said light energy in the form of pulses.

31. A system as in claim 30 wherein said argon-fluoride excimer laser is tuned to an operating wavelength of approximately 193 nanometers.

32. A system according to claim 31 wherein means for generating said plurality of ratios utilizes said vibrational energy level peaks in a wavelength range between approximately 186–195 nanometers.

33. A system for determining temperature of a gas at a density not to exceed approximately $3 \times 10^{17}$ molecules per cubic centimeter and seeded with molecules of iodine, said system comprising:
  means for directing light energy into said gas so-seeded, said light energy having a wavelength selected from the range of 175–210 nanometers and having a bandwidth not to exceed seven wavenumbers, wherein Cordes bands of said molecules of iodine are excited resulting in fluorescent emission having light intensity;
  means for collecting at least a portion of said light intensity;
  means for generating a spectrograph of said portion of said light intensity, wherein vibrational energy level peaks as a function of wavelength are defined; and
  means for fitting said vibrational energy level peaks to a vibrational Boltzmann distribution using i) one of said vibrational energy level peaks associated with molecule population in a ground vibrational energy level at a wavelength greater than said wavelength of said light energy and ii) others of said vibrational energy level peaks associated with molecule population in a vibrational energy level that is greater than said ground vibrational energy level, wherein a unique linear relationship is defined by said vibrational Boltzmann distribution for each temperature of said seeded environment.

34. A system as in claim 33 wherein said means for directing comprises an argon-fluoride excimer laser generating said light energy in the form of pulses.

35. A system as in claim 34 wherein said argon-fluoride excimer laser is tuned to an operating wavelength of approximately 193 nanometers.

36. A system according to claim 35 wherein means for fitting utilizes said vibrational energy level peaks in a wavelength range between approximately 186–195 nanometers.

37. A system for determining temperature of a gas at a density not to exceed approximately $3\times10^{17}$ molecules per cubic centimeter and seeded with molecules of iodine, said system comprising:
  means for exciting Cordes bands of said molecules of iodine with light energy of a known wavelength to generate fluorescent emission having light intensity;
  means for collecting at least a portion of said light intensity;
  means for generating a spectrograph of said portion of said light intensity, wherein vibrational energy level peaks as a function of wavelength are defined; and
  means for generating a plurality of ratios that define a unique linear relationship for a temperature of said seeded environment, each of said plurality of ratios defined by a ratio of i) one of said vibrational energy level peaks associated with molecule population in a ground vibrational energy level at a wavelength greater than said wavelength of said light energy to ii) another unique peak of said vibrational energy level peaks associated with molecule population in a vibrational energy level that is greater than said ground vibrational energy level.

38. A system as in claim 37 wherein said means for directing comprises an argon-fluoride excimer laser generating said light energy in the form of pulses.

39. A system as in claim 38 wherein said argon-fluoride excimer laser is tuned to an operating wavelength of approximately 193 nanometers.

40. A system according to claim 39 wherein means for generating said plurality of ratios utilizes said vibrational energy level peaks in a wavelength range between approximately 186–195 nanometers.

41. A system for determining temperature of a gas at a density not to exceed approximately $3\times10^{17}$ molecules per cubic centimeter and seeded with molecules of iodine, said system comprising:
  means for exciting Cordes bands of said molecules of iodine with light energy of a known wavelength to generate fluorescent emission having light intensity;
  means for collecting at least a portion of said light intensity;
  means for generating a spectrograph of said portion of said light intensity, wherein vibrational energy level peaks as a function of wavelength are defined; and
  means for fitting said vibrational energy level peaks to a vibrational Boltzmann distribution using i) one of said vibrational energy level peaks associated with molecule population in a ground vibrational energy level at a wavelength greater than said wavelength of said light energy and ii) others of said vibrational energy level peaks associated with molecule population in a vibrational energy level that is greater than said ground vibrational energy level, wherein a unique linear relationship is defined by said vibrational Boltzmann distribution for each temperature of said seeded environment.

42. A system as in claim 41 wherein said means for directing comprises an argon-fluoride excimer laser generating said light energy in the form of pulses.

43. A system as in claim 42 wherein said argon-fluoride excimer laser is tuned to an operating wavelength of approximately 193 nanometers.

44. A system according to claim 43 wherein means for fitting utilizes said vibrational energy level peaks in a wavelength range between approximately 186–195 nanometers.

* * * * *